(12) United States Patent
Trahan

(10) Patent No.: US 11,118,104 B2
(45) Date of Patent: Sep. 14, 2021

(54) CLAY CONTROL ADDITIVE FOR WELLBORE FLUIDS

(71) Applicant: David O. Trahan, Lafayette, LA (US)

(72) Inventor: David O. Trahan, Lafayette, LA (US)

( * ) Notice: Subject to any disclaimer, the term of this patent is extended or adjusted under 35 U.S.C. 154(b) by 0 days.

(21) Appl. No.: 17/054,036

(22) PCT Filed: May 10, 2019

(86) PCT No.: PCT/US2019/031848
§ 371 (c)(1),
(2) Date: Nov. 9, 2020

(87) PCT Pub. No.: WO2019/217908
PCT Pub. Date: Nov. 14, 2019

(65) Prior Publication Data
US 2021/0230473 A1    Jul. 29, 2021

Related U.S. Application Data

(60) Provisional application No. 62/669,871, filed on May 10, 2018.

(51) Int. Cl.
| *C09K 8/68* | (2006.01) |
| *C09K 8/66* | (2006.01) |
| *C08L 5/00* | (2006.01) |
| *C08L 3/04* | (2006.01) |

(52) U.S. Cl.
CPC ............... *C09K 8/68* (2013.01); *C09K 8/665* (2013.01); *C08L 3/04* (2013.01); *C08L 5/00* (2013.01)

(58) Field of Classification Search
None
See application file for complete search history.

(56) References Cited

U.S. PATENT DOCUMENTS

| 4,554,021 | A | 11/1985 | Harvey et al. | |
|---|---|---|---|---|
| 6,203,711 | B1 | 3/2001 | Moffett | |
| 2009/0095535 | A1 | 4/2009 | Nguyen | |
| 2013/0065798 | A1* | 3/2013 | Amanullah | C09K 8/08 507/104 |
| 2015/0072901 | A1* | 3/2015 | Samuel | C09K 8/516 507/104 |
| 2015/0183979 | A1 | 7/2015 | Pabalan et al. | |
| 2016/0333258 | A1 | 11/2016 | Drake et al. | |
| 2018/0155614 | A1* | 6/2018 | Soane | E21B 43/267 |

* cited by examiner

*Primary Examiner* — John J Figueroa
(74) *Attorney, Agent, or Firm* — Matthews, Lawson, McCutcheon & Joseph, PLLC

(57) ABSTRACT

A clay control additive for wellbore fluids comprises a blended starch polymer solution comprising a quarternary amine-functionalized starch polymer. The polymer is preferably cationized to a degree of substitution of at least 0.30. The starches may be synthetic or blended from natural amylose cationic starches. In an embodiment, a further additive comprises cactus mucilage obtained from the *Opuntia* genus, which may be combined with the starch polymer in a 1 to 95% solution. In another embodiment, both the starch and the mucilage may be further combined with conventional additives (e.g., choline chloride) to further enhance the clay control properties.

11 Claims, 6 Drawing Sheets

CLAY CONTROL ADDITIVE FOR WELLBORE FLUIDS

REFERENCE TO RELATED APPLICATIONS

The present application is a US national stage application claiming priority to Patent Cooperation Treaty (PCT) Application No. PCT/US2019/031848, entitled "Clay Control Additive for Wellbore Fluids," filed 10 May 2019 that in turn claims priority to U.S. Provisional Patent Application No. 62/669,871, entitled "Clay Control Additive for Wellbore Fluids," filed 10 May 2018. The contents of both above-referenced applications are incorporated herein by reference.

FIELD OF THE INVENTION

Embodiments of the invention relate to one or more environmentally friendly liquid chemical agents used to prevent clay from swelling or disintegrating when exposed to water containing lower electrolyte concentration than the resident water surrounding the clay. More particularly, the invention relates to environmentally friendly liquid chemical agents used to stabilize clays and shales during the drilling, completion and fracturing of wells for the production of oil, gas and other fluids from subterranean geological formations or used to stabilize clays in geological formations where produced and other water are injected for disposal or for enhanced oil recovery. The invention also relates to environmentally friendly chemical agents used to reverse the effects of swelling, if swelling of clay particles has already occurred.

BACKGROUND OF THE INVENTION

Water-based fluids have been used for many years to drill, complete, stimulate and fracture subterranean formations in the search for oil, gas and other formation fluids. In hydraulic fracturing, water is introduced into downhole formation via a drilled well bore lined with a metal casing. The subterranean geological formation, believed to contain oil, gas and other fluids. is penetrated using a specialized explosive charge device to perforate the metal casing and create a crack or penetration into the shale formation. This completion step is followed later by the high-pressure injection of water containing one or more chemical additives with and without the addition of a proppant. The flow rate and pressure are at least sufficient to create and extend a fracture into a desired portion of the geological formation. While other fluids may be used in the completion process, the vast majority of completion fluids are water-based.

The presence of clay in an oil and gas producing formation presents problems for production of oil, gas and other fluids from the subterranean geological formation. Many clays are inert in the formation and do not interfere or disrupt the flow of oil & gas. Clay minerals include an assortment of chemical and physical structures. In oil & gas producing formations, clay minerals such as: kaolinite, smectite, illite, chlorite are abundant in the geological formations where oil and gas are found. Shales are fine-grained rocks that form from the compaction of silt and clay-sized particles. It is estimated that sixty percent of the Earth's crust consists of shale, which is the primary source rock for most of the conventional hydrocarbon deposits in the world. Clays are naturally occurring layered minerals formed by weathering and decomposition of igneous rock. The oil and gas production zones that contain clays have been dehydrated over geologic time by overburden pressure. The amount of pressure applied to the clay, which results in the thickness of the clay platelets, is dictated by the amount of overburden that exists above the zone of interest as in the depth of the oil and gas producing zone in the well.

Clays dispersed throughout oil & gas producing formations may be described as stacked platelets having, for example, a net positive charge associated with the four short dimensional sides of each clay platelet and a net negative charge associated with the two long dimensional faces of each clay platelet. In other embodiments, the number of sides of each clay platelet can vary, including more or less than four sides for each clay platelet. For example, in an embodiment, the clay platelet can have six sides associated with a net positive charge and two faces (i.e., top face and bottom face) having a net negative charge. It is generally understood that the concept of surface charge may be used to understand the mechanisms involved in the swelling inhibition of clay particles. The net negative charge on the platelet face is typically balanced mainly by sodium ions, although other inorganic cations may also be present in minor amounts. The cations, or charge-balancing ions, associate with the platelet faces and are termed "exchangeable" as they are readily substituted with other cations.

When clay and water are mixed, water penetrates between platelets, forcing the platelets to move apart, an action characterized as "swelling." The cations on the platelet face begin to diffuse away from the platelet faces. At the deep subterranean depths, typically associated with oil & gas production, the geological over-burden forces out the inter-layer water to minimum concentrations. When the clay is exposed to water under pressure, and at ineffective levels of cationic mineral ions, swelling and solids disintegration can occur.

In order to inhibit the swelling phenomenon, minimization of the hydratable surface area of the clay is necessary. This can be accomplished by flocculating and decreasing the surface charge density, or by increasing the ionic strength of the water phase, or both. By allowing cations with small charge-to-surface area ratios to associate with the clay particle (clay platelet), the effective strength of the solution will also have the same effect. Often the salt-containing water is used in the water-based fluids. The salt can be potassium chloride (KCl), which can convert the clay to a less swellable form by potassium cation exchange with the sodium (Na+) ions present on the clay surfaces. Other salts can be used and can include calcium chloride, ammonium chloride, and the like, typically dissolved in the water-based drilling and stimulation fluids used in well completion and well fracturing.

While certain salts may be effective in protecting the clay-containing geological formation, several problems are associated with their use, for example: (1) the amount of salt material needed for preparing an effective water-based fluid may be high, and it is often difficult to dissolve the solid salt components in the completion fluid in the quantities required, or in the time allotted; (2) in environmentally sensitive areas, there may be limits on the amount of chloride permitted; (3) the presence of high concentrations of salt may interfere with the function and performance of other chemical additives in the stimulation fluid, such as, for example, water-viscosifying agents and friction reducers. The hydration and performance of many viscosifying and friction reducing agents are inhibited by such salts.

For example, a fracturing (frac) tank usually can contain 500 bbls (80 m$^3$ or 21,000 gallons) of water, and can require 1,591 kg (3,507 lbs) of KCl to mix the one frac tank to form a 2% KCl solution, which can be a typical suitable concentration for a working fluid. The KCl can be mixed in the water prior to adding the other chemical additives, which can take approximately one-half hour to form the KCl solution for each frac tank. There is also considerable man power required to mix the KCl into solution. In addition to the labor costs, there is also the risk of injury. In addition, there are safety concerns so the 2% KCl solution must be contained, as an uncontrolled release of this liquid into the environment can cause damage to local flora and fauna.

There is a need for a clay control agent that can function at a low concentration and can be environmentally acceptable. There is also a need for an effective chemical agent to control clay swelling and to reduce the hydration and migration of clay particles in all or substantially all of the clay constituents in a heterogenous clay/shale formation while operating under increasingly stringent environmental guidelines.

The invention and embodiments thereof, described in the present application, meet these needs.

SUMMARY

The present invention relates, generally, to a clay stabilizer for providing improved clay inhibition in drilling, completion and well fracture fluids, wherein the improvement is the addition of a clay-stabilizing agent, comprising an effective amount of a combination of a quaternary amine-treated starch, in water, which is capable of cation exchange and polymeric enveloping of clay/shale particles. The clay stabilizer of this invention provides a universal protection against clay swelling and clay fines migration, regardless of the clay present in the formation.

The embodiments of the present invention are capable of restoring permeability in subterranean geological formations that have been previously damaged, such as through the introduction of untreated or poorly treated water or aqueous based drilling or completion fluids. The clay stabilizer can be used without prior knowledge of or the need to determine the clay types in the formation, and variations of the clay stabilizer blends may be used in water-based drilling fluids, well fracturing fluids, acidizing fluids, or can be used alone to treat previously damaged wellbores to restore permeability therein.

In a broad aspect of the invention, the clay stabilizer comprises effective amounts of one or more quaternary amine functionalized starch polymers that are capable of cation exchange within the one or more clay types within the geological formation. Each of the quaternary amine functionalized starch polymers can have a similar or different molecular weight and configuration relative to each of the other quaternary amine functionalized starch polymers, with the balance being water. The quaternary amine-functionalized starch polymer of the invention can have an average molecular size of up to 2,000 repeating units and may have a molecular weight of up to 1 million repeating units.

Another object of the invention is to provide clay/shale stabilizing functioning over a wide pH range of at least 4.0 to 13.0.

Embodiments of the invention provide advantages over the prior art. The clay stabilizer of the invention provides a clay-stabilizing agent which is substantially odor free, and poses little to no threat to the environment by eliminating the use of harmful chemical compounds in its production. The clay stabilizer of the invention provides a clay-stabilizing agent that is at least as effective as the most effective prior art agent, and is at least as cost effective as the prior art agents. Other objects and advantages of the present invention will become apparent upon consideration of the ensuing description.

DRAWINGS

DETAILED DESCRIPTION

Figure 1:
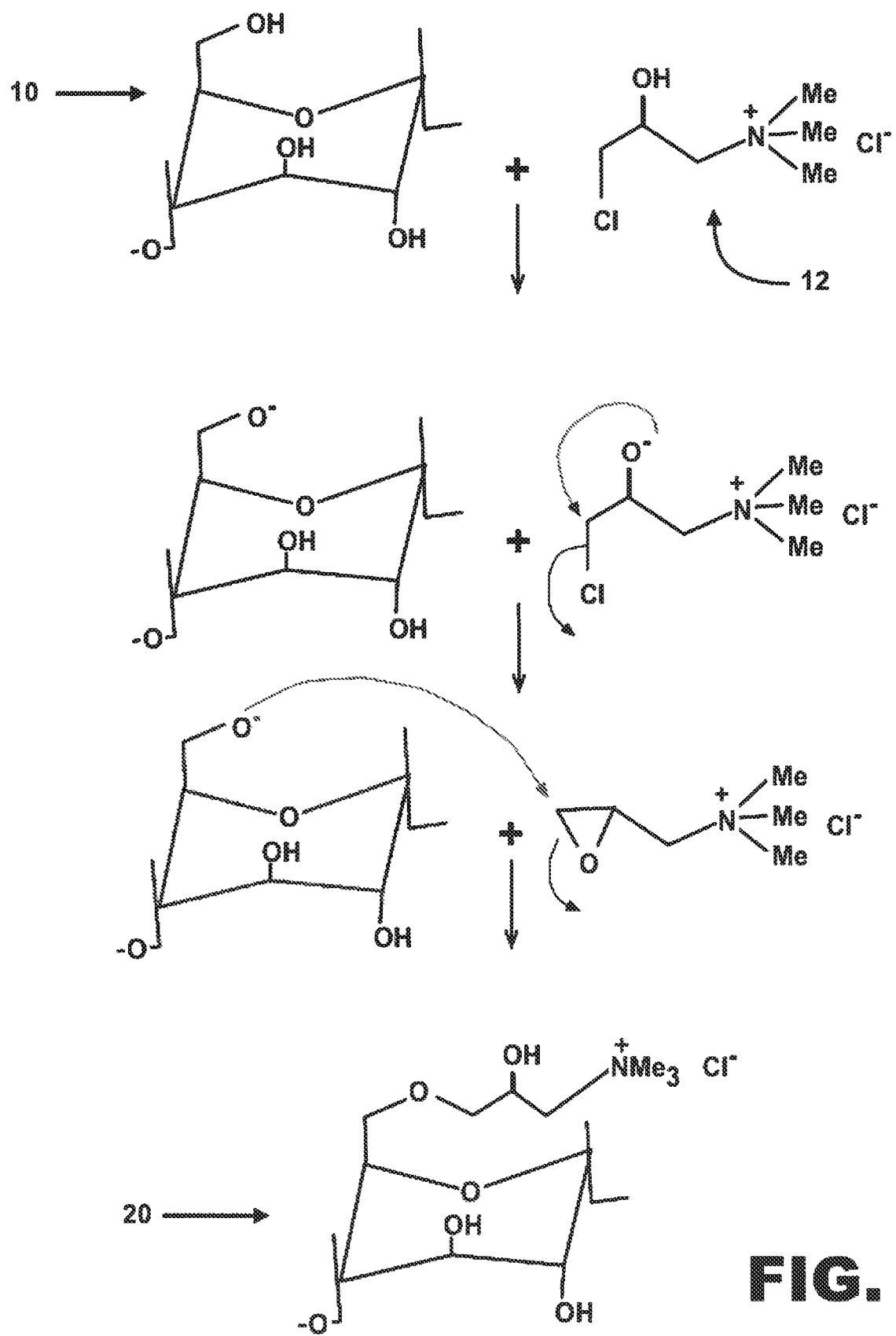
FIG. 1 depicts an embodiment of a cationization reaction usable in the present invention.

The present invention is a clay control treatment for the common types of clay, including layered silicates, oxides, amorphous/allophones, and chained silicates. Typically, a clay particle is about one nanometer in thickness and up to several nanometers in width. Each layer is comprised of fused sheets of octahedral $Al^{+3}$, $Mg^{+2}$, or $Fe^{+3}$ oxides and sheets of tetrahedral $Si^{+4}$ oxides. If a clay mineral contains one tetrahedral sheet and is bonded to one octahedral sheet, it is known as a 1:1 clay. An octahedral sheet bonded to two tetrahedral sheets is known as a 2:1 clay. The clays are classified as expanding (smectite) and non-expanding clays (illite and micas) on the basis of the sheet where isomorphous substitution takes place. Clay minerals are colloids and are characterized by a small particle size and large surface area. The surfaces carry charges which influences their ability to attract or repulse charge ions to or from surfaces. Clay minerals have large cation exchange capacities, this enables them to be modified to enhance sorption of organic and anionic contaminants.

When these subterranean oil and gas formations containing clay particles are exposed to fresh or lower salinity water-based drilling fluids or water-based completion fluids, such as in well fracture operations, the clays may osmotically absorb water from the water-based drilling fluid and, in turn, swell. The swelling of the clay induces stresses, loss of mechanical strength, and can lead to shale failure or disintegration of the shale, which may lead to plugging of the pore spaces that exist or were created during the formation fracturing operations, which potentially reduces the flow of oil and gas from within the zone, into the well bore and up to the surface. The production of oil, gas and fluids can be restricted by the presence of clays or other fines capable of migrating within the formation. These fines tend to migrate as the oil, gas and fluids flow from the reservoir rock into the wellbore. The fines encounter constrictions in the capillary flow channels of the reservoir formation and bridge off the flow channel, thus severely reducing the flow of oil, gas and fluids into the wellbore.

Water-based drilling fluids and water, used in the completion and well fracturing operations, has been shown to disturb the fine clay particles. The clay particles are generally subcategorized as water-swelling and water-fracturing particles. The water-swelling clay particles are generally comprised of smectite clay, and the non-swelling, water-fracturing clay particles are comprised of illite clay. These two general subcategories of clay particles are a major cause of formation damage and reduced flow or loss in production of oil, gas and fluids from subsurface geological reservoir formations. Smectite clays are of the type 2:1 and frequently occur in drilling and completion situations. Sodium saturated smectite swells macroscopically, which causes instability of shales during drilling operations and during well completions. The wellbore may collapse as a result of this swelling, or the production zone in the oil and gas-producing reservoir can be shut off.

The cations present at the clay platelet faces begin to diffuse away from the platelet faces. Further, the amount of water contained within the platelets is dependent upon the pressure under which the clay is located. In oil and gas producing formations, much of the water between the platelets has been squeezed out and forms spaces, wherein each space is only a few molecules thick with the water bound to the internal clay surfaces and the cations associated with the clay structure. The water sensitive clay can be located on the surface or subsurface in geological formations. The chemical agents described herein minimize swelling and migration of clay fines found in clay containing formations and have demonstrated an ability to substantially reverse the effects of swelling, if swelling has already occurred.

The effect of water on clay particles occurs generally by three mechanisms: (1) surface hydration through bonding of water molecules to oxygen atoms on the surface of the clay platelets, (2) ionic hydration through hydration of the interlayer cations with surrounding shells of water molecules, and (3) osmotic hydration that occurs in some clays after they are completely surface and ionically hydrated.

While all clays experience hydration, smectite and illite clays exhibit varying degrees of ionic hydration. When surface hydration occurs, the osmotic absorption results in two distinctly different problems. One problem includes swelling in the case of smectitic clays, where the clay platelets expand due to water uptake. The other problem is fracture in the case of illitic clays, where dispersion of clay particles occurs. Swelling is less common in harder shales, due to lower smectite content. However, high downhole stresses can lead to a fracturing of the illite containing shale, especially if accompanied by high pore pressures. Once the illitic clays fracture, the resulting disintegrated particles can travel through the oil & gas producing formation and lodge in pore channels reducing and/or plugging the flow of fluids from within the formation into the well bore. Most fractures are not bounded by barriers of sufficient strength to contain the fracture, e.g., contain height growth. The majority of fractures are radial from the well bore. The natural and man-made fractures within the formation can be damaged by contact with fresh water or water absent of any clay control chemical additives.

It has been found that potassium (K+) is much better at creating electrostatic links between negatively charged faces of the stacked clay platelets than the abundant Na+, therefore allowing less osmotic migration of water to occur between the clay platelets. Monovalent cations have lower hydration energies than divalent cations, and ions with smaller radii have greater hydration energies than those with larger radii. Large radii monovalent cations, like K+, have the lowest hydration energies, and small divalent cations have the highest hydration energies, such as Magnesium (Mg+2). Low hydration energy correlates with minimized swelling of clays.

Evaluating the performance of clay stabilizers on swelling clays is commonly performed using a capillary suction test (CST). This test can be used to examine the sensitivity of various formation solids samples and also to compare the performance of any clay stabilizer on a physical clay sample. The CST column is packed with a 60 mesh (between 300 and 340 micron) clay sample, and the time for the sample to imbibe 2 cm through the filter paper and the shale is recorded as CST time in seconds. Shorter CST time indicates less water is adsorbed by the clay particles, and the more inhibitive the clay stabilizer is on a particular sample, and the longer the time, the less inhibitive the clay stabilizer. The CST thus measures the ability to limit swelling clays.

For evaluating the performance of clay stabilizers on migrating or fracturing clays, their permeability can be measured on an apparatus that can consist of a one foot column that is packed with 20/40 mesh sand packed and crushed clay or shale sample. Without the clay stabilizer, the permeability decreases from roughly 130 Darcies to about 70 Darcies after flowing at 80 ml (2.7 fl oz.)/min for 30 minutes. Using a clay stabilizer in the water flowing through the apparatus, the permeability remains constant over the course of the test, indicating that the clay fines were immobilized.

The clay stabilizers, used to prevent swelling clay interference, are more typically ion exchange driven, where the clay stabilizers to prevent fines migration are more typically polymeric types.

Embodiments of the present invention comprise a mixture of constituents applicable for use in heterogeneous shale/clay formations as a clay stabilizer to minimize swelling and migration of fines within the formation.

More particularly, the clay stabilizer usable in the present invention can comprise an aqueous-blended cationic starch polymer composition that can be used as an additive in other wellbore fluids or can be used alone as a treatment for the wellbore, typically in matrix stimulation. The clay stabilizer can contain effective amounts of one or more commercial starch quaternary amine-functionalized starch polymers, with an average molecular size of up to 2,000 repeating units that are capable of cation exchange within one or more clay types, which exist in the homogeneous and heterogeneous formations.

As used herein, a starch is a polysaccharide that is comprised of repeating glucose units. The starch molecule has a basic chemical formula of $(C_6H_{10}O_5)n$. The glucose units can be arranged in a straight chain manner identified as Amylose, or in a highly branched manner identified as Amylopectin. The starch is cooked in water to prepare it for commercial use. Cooking affects the starch granule's structure and properties. Starch is later modified to provide various properties including: viscosity development and stability; mitigate degradation and set back; freeze thaw stability; heat, acid and shear stability; ionic strength and flocculation; emulsification, and texture. Chemical derivatization of the starch can create a starch derivative with either a cationic, anionic, or nonionic charge. The chemical derivatization introduces special functionalities.

FIG. 1 depicts an embodiment of the invention in which the active ingredient of the clay stabilizer comprises a quaternary amine functionalized starch polymer. An example of a preferred quaternary amine reagent is an aqueous solution of monomer (3-chloro-2-hydroxypropyl) trimethylammonium chloride (CHPTAC) 12. This chemical may be used to modify starch polymers, depicted here as an anhydrous glucose unit 10, into quaternary ammonium compounds 20. The most important chemical building block of the starch is the anhydroglucose unit (AGU). Each glucose unit has three hydroxyl (OH—) functions available for etherification with CHPTAC. Under suitable reaction conditions, all hydroxyls can be etherified. In one embodiment of a wet process method, the reaction can be tested in a laboratory method for forming a cationic starch by reacting the CHPTAC with a starch product that involves adding 500 grams (17.6 oz) of distilled water into a 1-liter Erlenmeyer flask. Next, five (5) grams (0.18 oz) of the CHPTAC (quaternerizing agent) can be added into the water in the Erlenmeyer flask, followed by the addition of 60 grams (2.1 oz) of unmodified industrial grade corn starch. To the mixture, 5 grams (0.18 oz) of Sodium Sulfate ($Na_2SO_4$) can be added; and then, the mixture can be mixed well in a blender for approximately 7-minutes. To the mixture in the blender, 2 grams (0.07 oz) of quick lime (CaO) can be added, and the mixture can be mixed in blender for an additional 3 minutes. Then, the mixture can be poured from the blender into a 1-liter (0.26 gal) beaker, and the beaker can be placed into a hot water bath with water temperature of approximately 45° C. for about 6-hours. At the end of the 6-hours, the mixture can be neutralized to a pH of 6 to 8 with a 10N Hydrochloric acid (HCl). Quaternary ammonium compounds are cationic, meaning they carry a positive electrical charge. Cationic starch polymers are useful as flocculants and as clay control agents.

The embodiment set forth above is only one embodiment of the wet process method. Other embodiments can include varying amounts of the ingredients, varying times for blending and mixing, and varying temperatures for the hot water baths, as well as varying lengths of time for placing the mixture in the hot water baths. Depending upon the type of starch used as a starting material, the wet process to produce a cationic starch suitable for this invention involves a starch such as derived from corn, potato, or wheat with a moisture content of between 12% and 20%. Beginning with 200 grams (0.44 lbs) of starch that has been air dried to the moisture levels stated add from 12 to 18 grams (0.42-0.63 oz) of CHPTAC. To this mixture add 5.5 to 8.5 grams (0.19-0.28 oz) of a 30% solution of sodium hydroxide. Follow the first addition of sodium hydroxide with a second addition of 17 to 34 grams (0.60-1.20 oz) of a 10% sodium hydroxide solution. Between 165 to 192 grams (5.8-6.8 oz) of additional water can be added to the mixture to obtain a total quantity in the blend. The total amount of water can be reduced to increase the concentration however, due to the chemistry, a minimum quantity of water or moisture in the starch is always needed for the cationization reaction. If the water content gets too low, the slurry cannot be stirred properly or pumped efficiently. Quaternary ammonium compounds are cationic, meaning they carry a positive electrical charge. Cationic polymers are known to be useful as flocculants and as clay control agents.

Polymers with cationic groups demonstrate increased water solubility as a result of the highly water soluble quaternary ammonium group. A chemical process of reacting a quaternary amine with a starch polymer, preferably amylopectin, can produce the quaternary functionalized starch polymer. Cationization is measured by the "degree of substitution" (DS). The degree of substitution indicates the average number of hydroxyl groups on each AGU. In theory, the three OH sites available in each glucose unit for reaction means the maximum obtainable value for starch is 3. The degree of substitution is expressed as moles of reagent per AGU. When determining the actual obtained ("practical") DS, only the polymer bound portion is considered. The DS value is used for comparison purposes. In starch cationization, practical DS substitution of 0.50 and higher can be obtained. Depending upon the type and origin of the starch, biopolymers contain greater or smaller quantities of protein nitrogen.

Under alkaline conditions, this protein nitrogen is partially soluble in the reaction medium and is separated when the polymer is washed. To determine the yield correctly, the percentage of protein nitrogen, which is insoluble under the cationization conditions, must be deducted from the nitrogen content determined after washing. Without this correction, the yield values would be overstated. It is also possible to use a starch slurry directly from native starch production. In this case, minimum water concentration is given and each subsequent addition of reagents causes further dilution of the starch slurry. In order to avoid undesirable losses in reaction efficiency and production capacity, it is advantageous to prevent further dilution. The quaternary functionalized starch polymer can function with varying DS; however, it is preferred that the starch polymer have a high degree of substitution, for example, greater than 0.30 degrees. The higher degree of substitution demonstrates an improved binding to the clay particles.

In an embodiment of the invention, an aqueous slurry of cationic starch can be used, and the starch can be an amylose cationic starch. The starch may be obtained from any conventional source, including potato, corn, waxy corn, red milo, white milo, wheat, duckweed, and tapioca, and may be pearl or lightly thinned. In addition, the starch may have been oxidized, hydroxyalkylated, acid modified, enzyme converted or various combinations thereof. Higher molecular weight starches are preferred in embodiments of the present invention because of greater strength than low molecular weight starches. The starches from various sources may be blended and subsequently chemically treated to produce a formulated starch of a particular capability. It is important for the starch to contain cationic functionality to enhance the clay control performance. In an embodiment of the present invention, the starch can be pre-cooked and modified with cationic substitution of tertiary amine or quaternary amine groups to give the starch an overall cationic charge to function effectively as a clay control additive.

Non-limiting examples of a cationic starch polymer which may be used as a clay control additive in water-based completion, stimulation and well fracture operations, include, but are not limited to: AquaBloc 330AW from Aquasol or; ChargeMaster™ L-340 or ChargeMaster™ L-360 from Grain Processing Corporation or; Sta-Lok™ 280 from Tate & Lyle or; C Bond™ cationic starches from Cargill or: ViscoStar™ 4630, ViscoStar™ 4620 from International Starch Trading A/S; Wespoly™ from Western Polymer Corporation or: GlucoPlus™ C+2F, GlucoPlus™ C+2P, GlucoPlus™ C+3F, GlucoPlus™ C+3P from Chemstar or; RediBond™ 2038, RediBond™ 5327, RediBond™ 5330A, Optipro™ 650, Cato from Ingredion.

Figure 2:
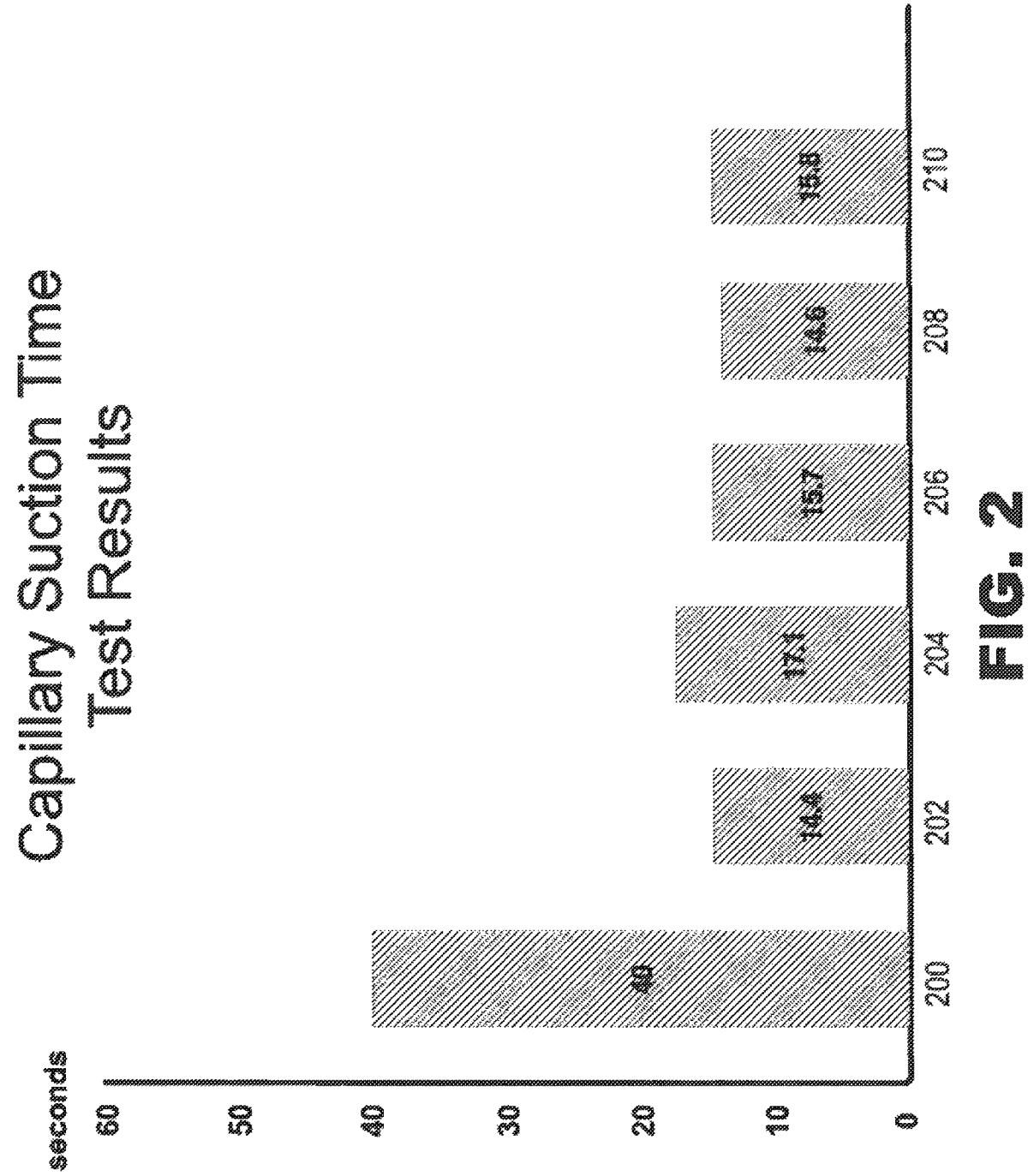
FIG. 2 depicts the results of a capillary suction test (CST) on several clay control agents and mixtures thereof, as described below.

Evaluating chemical additives for performance as a clay control additive is commonly done using a capillary suction time (CST) test 30, as shown in FIG. 2. The CST test has been widely used to study the colloidal properties of clay suspensions. The petroleum industry uses the CST test to characterize clay-containing shales and to optimize the electrolyte or ionic salt concentration in drilling fluids for minimizing its negative effects in such shale formations. In the CST test, the more flocculated the rock-water slurry, the more permeable the core sample and the shorter the time interval required to complete the test. Therefore, the shorter the CST time, the smaller the normalized value for a system, and the better the inhibition of shale swelling in the individual core sample.

When conducting the CST test, it is common to use a highly water sensitive clay sample, a sample with over 10% smectite, and expose this clay sample to fresh or salt water without any clay control treatment in the water. The CST value reported is considered the blank or untreated benchmark value. The lowered CST values reported for different clay control additives provide a range to quickly and easily identify the most effective clay control additive.

FIG. 2 depicts the results of a CST test performed using the preferred cationic starch polymer of this invention 202, and comparing the result to a blank untreated sample 200, as well as a sample treated with an industry leading clay control additive for use in well completion and well fracture operations 204. One of the leading clay control chemical additives today comprises a 50% to 70% aqueous solution of choline chloride. Choline chloride is a quaternary ammonium salt with a chloride anion. The chemical name is (2-hydroxyethyl) trimethyl ammonium chloride. Choline chloride is typically supplied with a pH from 7 to 9 with a specific gravity of 1.07 to 1.091. It is preferred today over the use of a tetramethyl ammonium chloride (TMAC) due to the fact it has been determined by researchers to be more environmentally friendly. Choline chloride is produced in large volumes for use as a clay control additive in completion and hydraulic fracturing, also as an important additive in animal feed and for forming deep eutectic solvents.

While choline chloride is the most preferred and used choline salt for clay control other suitable choline carboxylate counterion salts where the carboxylate counterion is of the general formula $R^1COO^-$, where $R^1$ is an alkyl group, alkenyl group, alkynyl group, an aryl group, an alkaryl group, an aralkyl group, alkenylaryl group, aralkenyl group, alkynylaryl group, aralkynyl group hetero atom analogs, where the hetero atom is selected from a group consisting of boron, nitrogen, oxygen, fluorine, phosphorus, sulfur, chlorine, bromine, iodine, and mixture or combinations thereof. A non-exhaustive list of exemplary examples of choline carboxylate counterion salts include choline formate, choline acetate, choline propanate, choline butanate, choline pentanate, choline hexanate, choline lactate, choline citrate, choline tartrate, choline itaconate, and mixtures and combinations thereof.

In a clay control test, the blank or untreated clay sample reported a CST value of 40 seconds when exposed to fresh water. Using the preferred cationic starch polymer at a 3% active concentration at a treated at a rate of 2-gallons per thousand gallons of water (approximately 2,000 mg/l) it reported a CST value of 14.4 seconds, a 178% improvement in clay control as compared to fresh water alone. When compared to choline chloride at the same treatment rate, the choline chloride CST value was recorded as 17.1 seconds. This demonstrates the cationic starch polymer of this invention providing a 16% improvement in clay control when compared to the use of the 70% aqueous choline chloride at the same treatment rate of 2-gallons per thousand gallons. The use of the cationic starch polymer offers an improved alternative to the use of choline chloride and avoids introducing a chloride salt into the environment.

In an embodiment, the invention may also comprise a unique clay control supplement made from a plant-derived, natural chemical additive that, alone or when combined with the cationic starch polymer, can further improve clay control results. The plant-derived, natural chemical additive is a mucilage extract of a cactus known for its mucilage production. Mucilage is a thick gelatinous substance produced by various plants, including cactus, which contains protein and polysaccharides and is similar to plant gums.

In particular, the *Opuntia* genus produces a complex carbohydrate with a great capacity to absorb water. A preferred plant to obtain cactus mucilage is the *Opuntia ficus-indica*, commonly referred to as the prickly pear cactus or nopal. The prickly pear cactus is commonly found in the southwestern United States and is considered an invasive weed which is difficult to control and is intruding onto productive grazing land for animals causing problems for farmers and ranchers. The prickly pear cactus is found in many regions around the world. In Mexico it is commonly found and cultivated in tree-like proportions. The mucilage is a thick, gummy substance that resembles an industrial hydrocolloid. When water enters the mucilage it swells, producing a unique surface-active property to the solution.

The mucilage contains varying proportions of many sugar residues, including 1-arabinose, d-galactose, 1-rhamnose, and d-xylose, as well as galacturonic acid. The molecular weight of the mucilage has been reported as different values, probably due to differences in extraction techniques and the possibility of contaminants. The molecular weight can range from as little as 3,000 up to over 1,000,000 daltons. The sugar residues have a demonstrated capacity to interact with metals and cations. The mucilage content is found primarily in the cactus cladodes. In some regions, farmers use cactus mucilage as a flocculant to purify drinking water by removing harmful metal constituents and reducing the turbidity of the water. The mucilage has the potential to precipitate ions and clay particles from aqueous solutions. The precipitation of clay particles reduces the migration of clay fines within the pores of the geological formation. Just as has been discovered how polyacrylamides and polysaccharides can be used as soil additives to improve the physical properties of soil, including infiltration of water, so can cactus mucilage.

Returning to FIG. 2, it can be seen that the mucilage extract from the prickly pear cactus performs well as a clay control agent alone 206 and in combination with the cationic starch polymer 208 and the choline chloride 210. For example, a blank untreated sample of clay in fresh water yields a CST value of 40 seconds. When the same clay sample is treated with 2 gallons per thousand gallons of cactus mucilage extract in fresh water, the CST value drops to 15.7 seconds. The lower the CST value the better the clay control performance. When the clay sample is treated at 2 gallons per thousand gallons (GPT) with the 70% choline chloride it reports a CST value of 17.1 seconds. The cactus mucilage extract reports approximately an 8% improvement in CST value.

In an embodiment, by combining the aqueous cactus mucilage solution with a cationic starch polymer at a 90:10 ratio (90 parts cationic starch polymer to 10 parts cactus mucilage) and added to the fresh water containing the same sample of water sensitive clay as used in the earlier tests, the CST is reported as 14.6 seconds, nearly a 15% improvement when compared to the industry leading clay control chemical, the 70% choline chloride solution. By using a blend comprising of 5% active aqueous solution of cactus mucilage and 35% active aqueous solution of choline chloride the CST is reported as 15.8 seconds, a 7.6% improvement. The result of comparative testing demonstrates how the extract of the cactus mucilage measurably improves the performance of clay control in water-based completion and fracture fluids.

Figure 3:
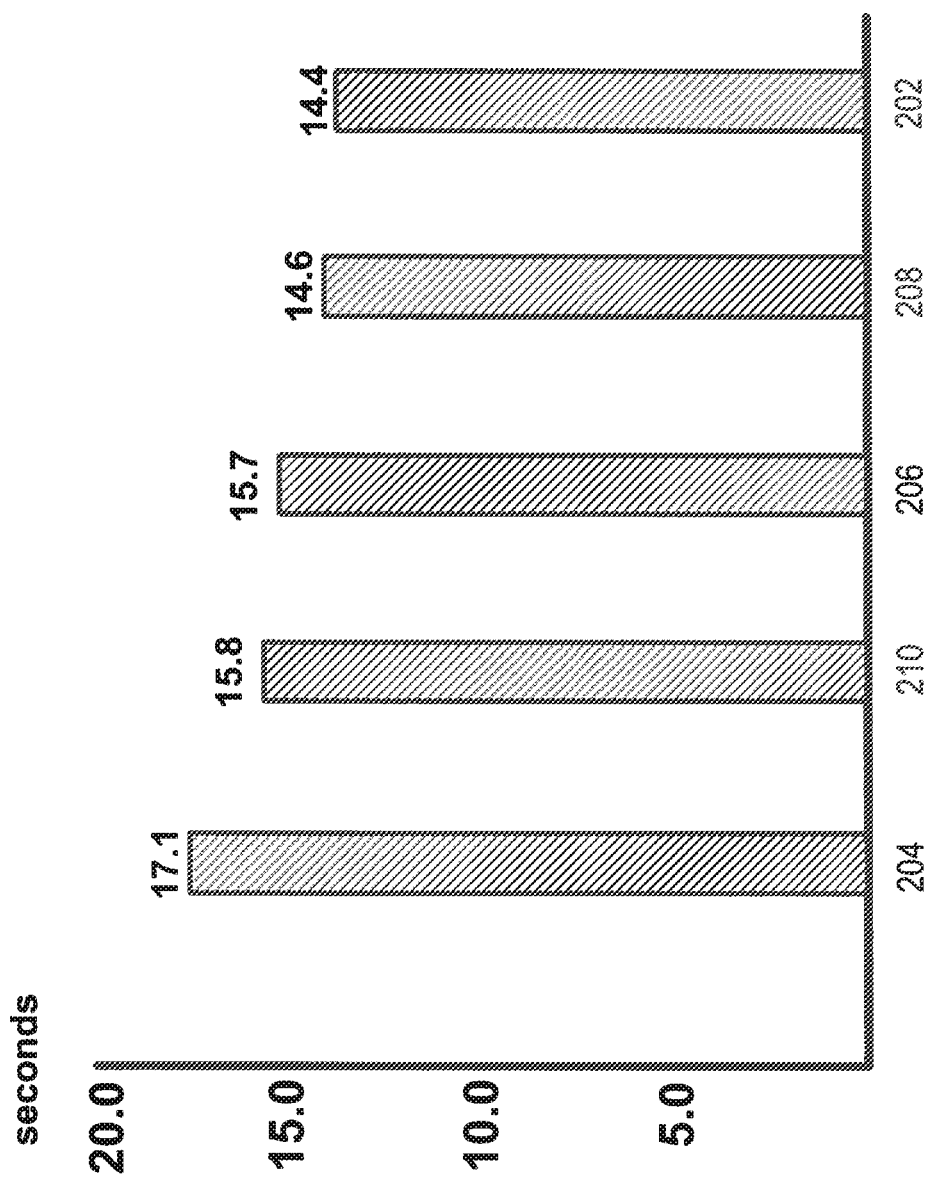
FIG. 3 depicts the results of a CST test on several clay control agents with and without a cactus mucilage additive, as described below.

Turning now to FIG. 3, the CST results are shown here in descending order of CST values (i.e., ascending order of efficacy). The blank CST run is eliminated in this graph for clarity. Shown are the standard 70% choline chloride additive 204, an additive of 5% cactus mucilage and 35% choline chloride 210, a 100% cactus mucilage additive 206, an additive of 90% cactus mucilage and 10% cationic starch polymer 208, and finally an additive of 3% cationic starch polymer 202.

In another embodiment, further testing of clay control performance included the combination of the preferred cationic starch polymer with aqueous electrolytes such as: potassium formate, potassium chloride, and sodium chloride. In all tests it was demonstrated the addition of as little as 0.5% of cationic starch polymer added to a aqueous electrolyte solution improved the clay control performance sufficiently allowing for the reduction of the concentration of electrolyte. For example, it is typical for oil & gas operators to use a 2% by weight solution (approximately 20,000 mg/L) of potassium chloride (KCl) in water to inhibit water-sensitive clay. By comparison, the cationic starch polymer of this invention functions satisfactorily as a clay control with as little as approximately 200 mg/L of active material in water, an improvement of 100 times.

Figure 4:
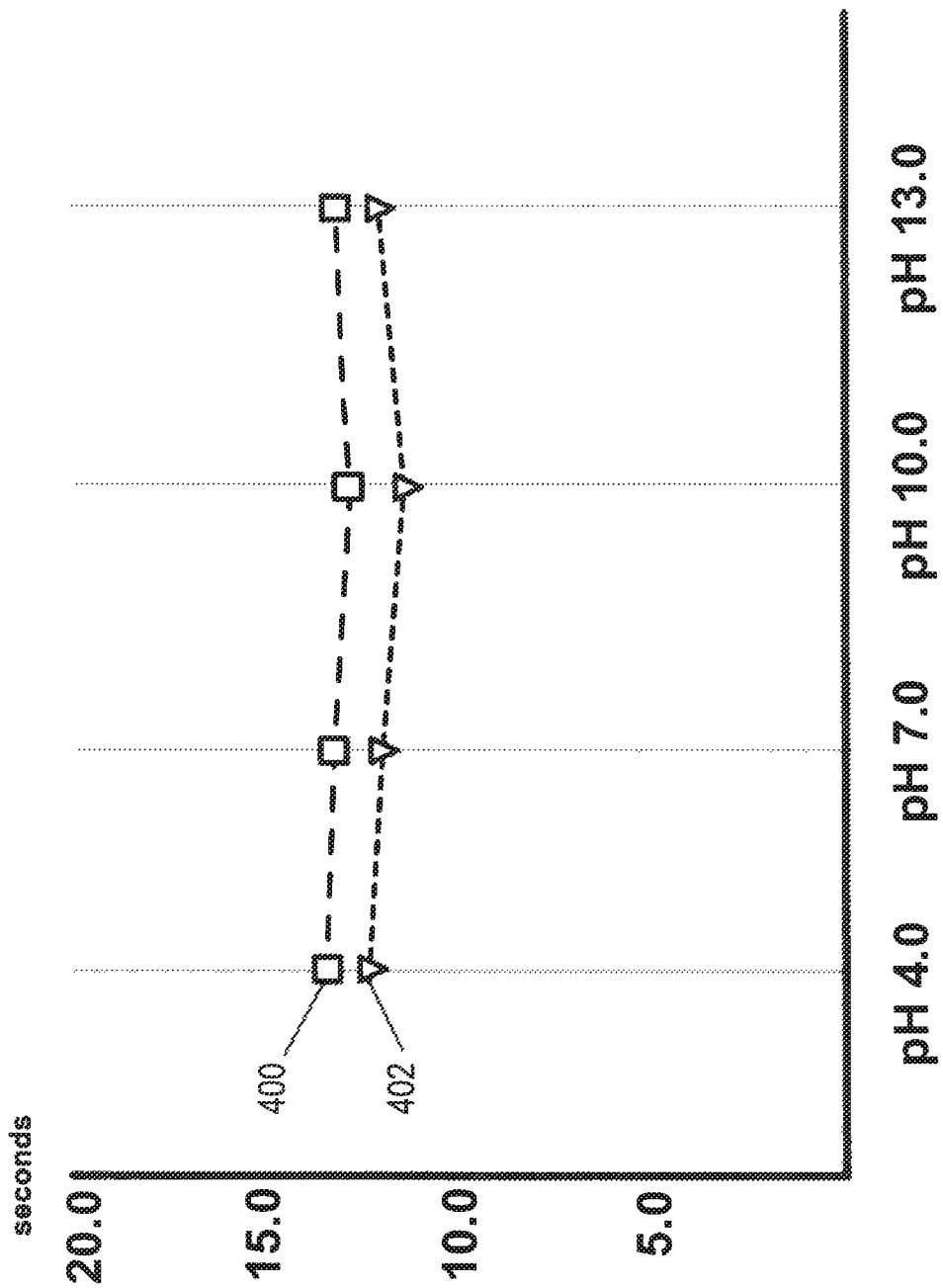
FIG. 4 depicts the results of a CST on several clay control agents at pH levels of between 4 and 13, as described below.

Turning now to FIG. 4, the results of further CST testing demonstrate that the quaternary amine cationic starch polymer of this invention, either alone in a 5% concentration 400 or at 5% concentration in combination with the 35% concentration of choline chloride 402, retains most of its functionality as a clay control additive at pH level of between 4 and 13. Importantly, these results also demonstrate that a small amount of the starch additive permits a drastic reduction in the amount of salt additive with an only modest corresponding reduction in clay control efficacy.

Figure 5:
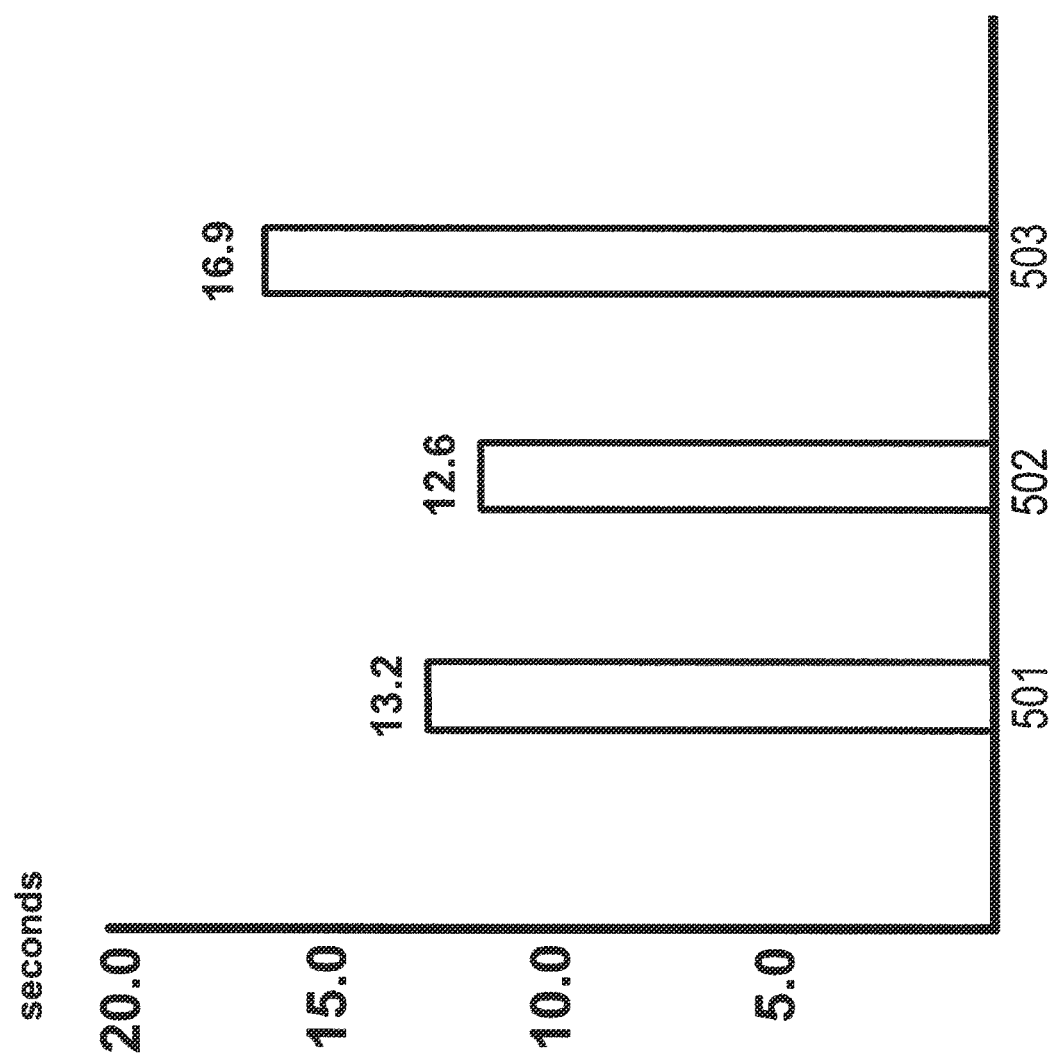
FIG. 5 depicts the results of a CST on several clay control agents with and without a cactus mucilage additive, as described below.

Turning now to FIG. 5, the results of further CST testing demonstrates that the cactus extract of this invention, in a 5% concentration in combination with a 10% potassium formate 502 is superior to a 5% quaternary amine cationic starch of this invention in combination with 25% choline chloride 501 and a 70% choline chloride 503.

Figure 6:
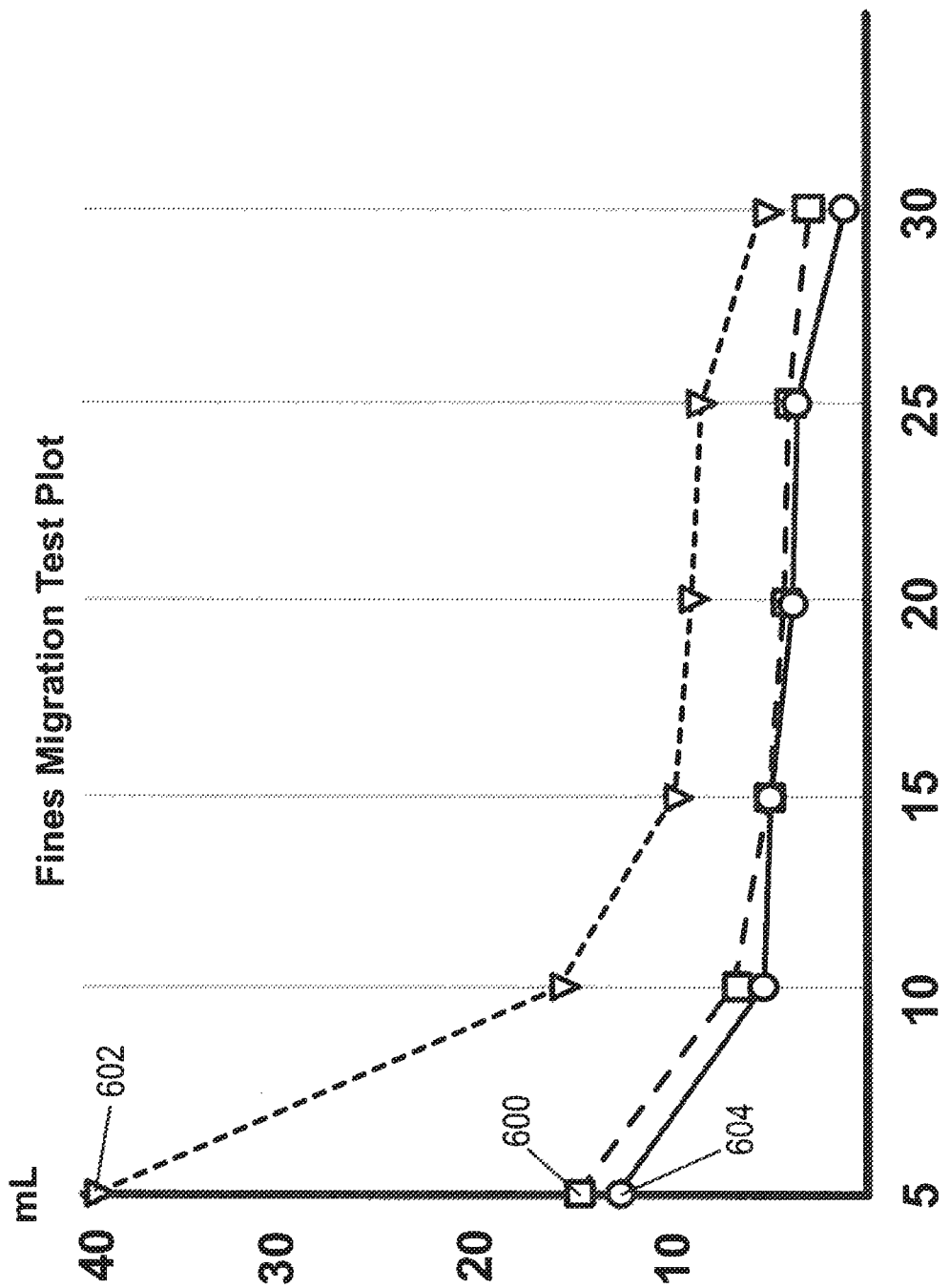
FIG. 6 depicts the results of a Fines Migration Test on several clay control agents and mixtures thereof, as described below.

Turning now to FIG. 6, the quaternary starch of this invention has, in addition to reducing clay swelling, demonstrated superior performance in reducing the migration of clay fines. This is especially true when a formation contains illitic type clay, which tends to fragment in presence of low salinity water or in the presence of water containing a lower dissolved solids concentration than the shale's resident water. The fragmenting of the clay causes small particles or "fines" to be dispersed in the water. Fines migration causes suspended particles in the production fluid to bridge over the pore spaces near the wellbore, causing formation damage and reducing productivity.

FIG. 6 shows the ability of the quarternary starch of this invention to agglomerate or flocculate the fine particles, stabilizing them within the formation and preventing migration through the wellbore. The results of a 30 minutes fines migration test are shown utilizing a blank (water) run 600, a run with a 5% concentration of the quaternary anime cationic starch (at 0.5 GPT) 602, and a run with a 70% concentration of choline chloride (also at 0.5 GPT) 604. Crucially, this test shows that the choline chloride additive by itself may actually worsen fines migration at some points. The quarternary starch of the invention, alone and in combination with choline chloride or potassium formate, demonstrates an improvement in reducing fines migration in low-salinity water compared to choline chloride alone.

While various embodiments usable within the scope of the present disclosure have been described with emphasis, it should be understood that within the scope of the appended claims, the present invention can be practiced other than as specifically described herein.

The invention claimed is:

1. A hydraulic fracturing fluid having clay stabilizing properties, the fluid comprising:
   between 99.0-99.8% of a solvent; and
   between 0.2-1.0% of a mixture comprising a functionalized quaternary cationic starch polymer and cactus mucilage,
   wherein the starch polymer has a degree of substitution of at least 0.30.

2. The fluid of claim 1, wherein the starch polymer is modified with cationic substitution of tertiary or quaternary amine groups.

3. The fluid of claim 1, wherein the starch polymer has a molecular weight of greater than 1,000 daltons.

4. The fluid of claim 1, wherein the solvent comprises water.

5. The fluid of any of claims 1-4, wherein the mixture comprises between 1-95 wt % of the starch polymer.

6. The fluid of any of claims 1-4, wherein the mixture further comprises between 1-95 wt % of the cactus mucilage.

7. The fluid of claim 1 wherein the cactus mucilage comprises cactus mucilage derived from the *Opuntia* genus.

8. The fluid of claim 1, wherein the mixture further comprises a salt.

9. The fluid of claim 8, wherein the salt is choline chloride, and wherein the mixture comprises between 5-70 wt % choline chloride.

10. The fluid of claim 8, wherein the salt is potassium chloride, and wherein the mixture comprises between 0.5-3 wt % potassium chloride.

11. The fluid of claim 8, wherein the salt is potassium formate, and wherein the mixture comprises between 5-50 wt % potassium formate.

* * * * *